United States Patent
Martin

[15] 3,677,089
[45] July 18, 1972

[54] PRESSURE GAUGE

[72] Inventor: Clyde J. Martin, Cincinnati, Ohio
[73] Assignee: Martin Industries, Inc., Cincinnati, Ohio
[22] Filed: March 18, 1970
[21] Appl. No.: 20,736

[52] U.S. Cl. ................................. 73/419, 137/557, 137/559
[51] Int. Cl. .......................................................... G01l 7/16
[58] Field of Search .......................... 73/419, 146.2; 92/5 R; 200/82 R, 81.4; 116/70, 34 R; 137/557, 559, 227

[56] References Cited

UNITED STATES PATENTS

| | | | |
|---|---|---|---|
| 905,778 | 12/1908 | Wolff | 73/146.2 |
| 3,236,097 | 2/1966 | Tessmer | 73/146.8 |
| 1,334,874 | 3/1920 | Miller et al. | 73/419 |
| 2,903,888 | 9/1959 | Gfoll | 73/419 X |
| 3,490,342 | 1/1970 | Reis | 200/81.4 X |
| 3,286,726 | 11/1966 | Guy | 73/419 X |
| 1,565,423 | 12/1925 | Dailey | 73/419 X |
| 2,891,120 | 6/1959 | Saholt | 200/82 |
| 1,892,088 | 12/1932 | Wahl et al. | 73/419 X |
| 3,388,682 | 6/1968 | Whiting | 116/70 |

FOREIGN PATENTS OR APPLICATIONS

| | | | |
|---|---|---|---|
| 203,890 | 7/1957 | Austria | 73/146.2 |

Primary Examiner—Louis R. Prince
Assistant Examiner—Daniel M. Yasich
Attorney—J. Warren Kinney, Jr.

[57] ABSTRACT

The pressure gauge is characterized by extreme simplicity, and involves the use of a transparent cylindrical reciprocable window through which may be viewed from all angles such scale calibrations as are carried by the gauge body. A booster is provided to assure smooth and accurate operation, aided by lubricant-impregnated bearing elements.

6 Claims, 7 Drawing Figures

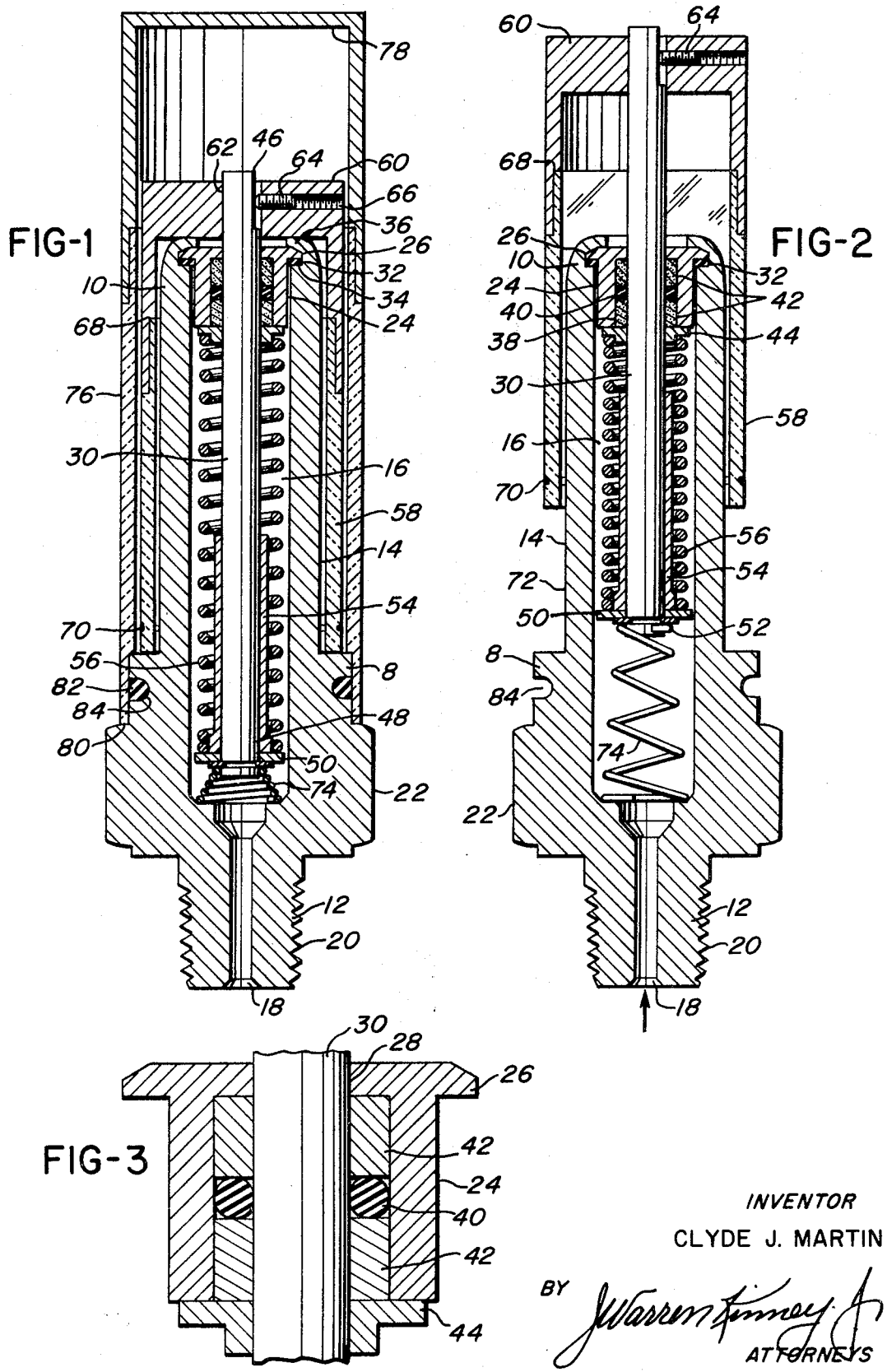

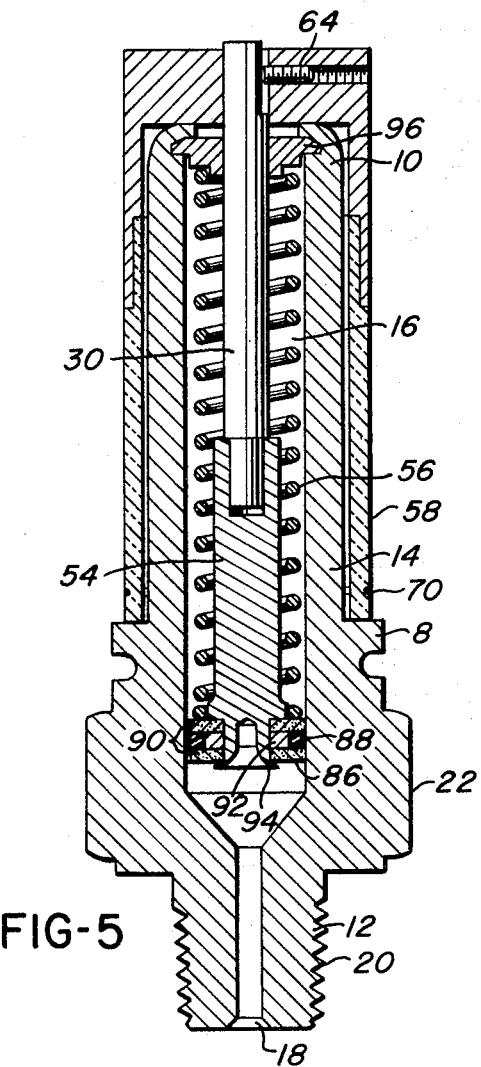
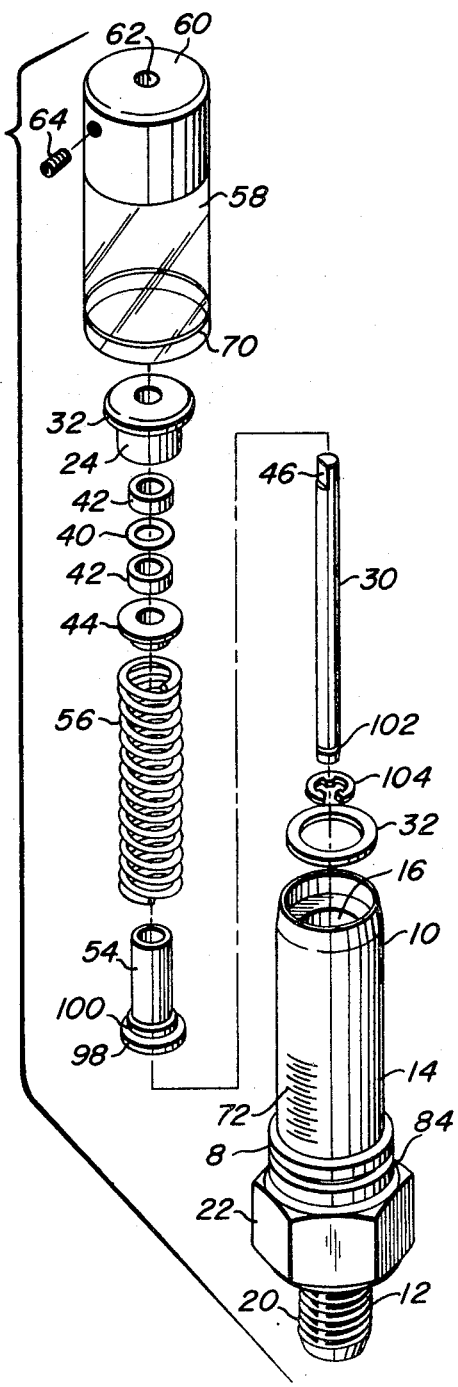
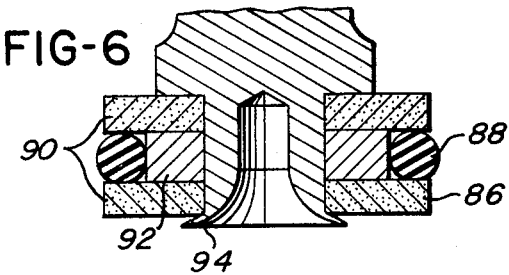
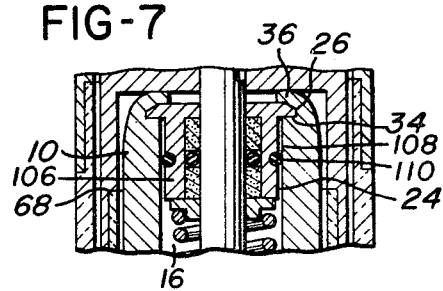

PRESSURE GAUGE

This invention relates to improvements in a pressure gauge, such as may be employed to measure and indicate the pressure of confined fluids, either gaseous or liquid.

The gauge is of the piston type, and incorporates a calibrated scale and indicator which are easily readable and easily adjustable. A booster spring within the gauge assures smooth and accurate operation, enhanced by built-in lubricating means which requires no attention or servicing throughout lengthy periods of use. Moreover, the improved gauge employs a minimum number of simple and inexpensive constituent parts which promote assembly of the gauge with a minimum expenditure of time, labor and expense.

An object of the invention is to provide an improved pressure gauge of simplified design which is easy to read and adjust.

Another object of the invention is to provide a piston type gauge composed of a minimum number of simple and inexpensive parts capable of being assembled quickly and very inexpensively.

Another object is to provide a gauge of the character started, which includes means of a simple nature for assuring smooth frictionless operation with a high degree of accuracy of performance.

A further object of the invention is to provide simple and inexpensive means for protecting the gauge against entry of extraneous gases or substances which might injure or impair the operation or the useful life of the gauge, and for protection against injury due to over-compression, severe surges of pressure, vibration, and similar adversities in use.

The foregoing and other objects are attained by the means described herein and illustrated upon the accompanying drawings, in which:

FIG. 1 is a longitudinal cross-section of one form of the improved gauge, which includes a protective transparent cover.

FIG. 2 is a view similar to FIG. 1 with the cover removed, the gauge being shown operative to indicate a pressure reading.

FIG. 3 is an enlarged cross-section of a piston rod and lubricating bushing illustrated by FIGS. 1 and 2.

FIG. 4 is an exploded perspective view of a slight modification of the FIG. 1 gauge.

FIG. 5 is a view similar to FIG. 1, showing a modification.

FIG. 6 is an enlarged cross-section of a piston assembly utilized in the modified structure of FIG. 5.

FIG. 7 is an enlarged cross-section showing a modification of the FIG. 3 structure.

Referring to the drawings, the reference numeral 8 denotes an elongate hollow body of brass or other suitable material, having an upper end portion 10, a lower end portion 12, an intermediate portion 14, and an axial main bore 16 providing a fluid chamber. The bore 16 at its lower end terminates in a reduced bore 18 open at the end portion 12 of the body and serving as a fluid inlet port. A mounting means for the gauge body is provided, and may consist of screw threads 20 or equivalent means at the end 12. If desired, a wrench-receptive area 22 may be provided on the body.

With particular reference to FIGS. 1, 2 and 3, it is noted that the upper end of bore 16 may be closed by a stationary cylinder head member 24 fitted into bore 16, and including a flange 26 apertured at 28 to slidingly support a piston rod 30. Beneath the flange of heat 24 may be placed a resilient seal gasket or ring 32, and as is clearly apparent from FIG. 1, the gasket 32 and the flange of head 24 are locked into a groove or seat 34 by rolling the body material inwardly onto the head at 36 for securely clamping the flange and the gasket within the body to provide a leak-proof seal.

The cylinder head member 24 preferably includes an annular chamber 38 within which is snugly received a fixed resilient seal ring or O-ring 40 that slidingly embraces the piston rod; and ring 40 is flanked by a pair of lubricant-impregnated bushing elements 42, 42 which snugly but slidingly surround the piston rod so as to provide a constant supply of lubricant to the rod. The bushing elements 42 may be of compressed powdered bronze or other material impregnated with a lubricant which will withstand the injurious effects of such fluids as may enter the gauge body. The parts 42 and 40 may be retained by a spring keeper 44 which surrounds the piston rod and closes the lower end of chamber 38.

Piston rod 30 has an upper end portion 46 and a lower end portion 48. Portion 48 carries a circular piston head 50 secured to the piston rod in any suitable manner, as by means of a slip ring assembly 52. The piston body 54 extends upwardly from the piston head to securely embrace the rod 30. A compression spring 56 surrounds the rod 30 and body 54, with opposite ends of the spring bearing constantly upon piston head 50 and keeper 44. The piston rod 30 and piston parts 50 and 54 move unitarily lengthwise in the body bore.

The reference character 58 indicates a movable transparent or translucent cylindrical window element formed of plastic material, or glass if desired, and dimensioned for free slidability along the upper and intermediate portions of body 14, which are also cylindrical. The window element includes a head portion 60 which overlies the upper end of body 14, and has a central aperture 62 receptive of the upper end of piston rod 30. At 46, the rod may be provided with a flat as shown, against which may impinge a set screw 64 threaded into a transverse bore 66 of head portion 60. By means of set screw 64, the window element may be locked onto the piston rod at selected elevations along the rod.

It should here be noted that head portion 60 may be an inverted cup-shaped part securely cemented or otherwise fixed to the transparent cylinder at the annular joint 68; however, if desired, the head portion may be molded or otherwise formed integrally with cylinder 58.

As will be understood, fluid under pressure may be introduced into the gauge body 14 through the entry port or bore 18, to fill the main bore of the gauge body above and below the piston head. By reason of the fact that the area of the piston exposed to the fluid pressure from below is more extensive than the area exposed above, the pressure of fluid admitted to the gauge body will act always to elevate or advance the piston and extend the rod 30 according to FIG. 2. Such advancement of the piston rod does not depend upon a snug fit of the piston head within the body bore. It has been determined that the loosely fitting piston head is preferred over a sealing-type piston in gauges measuring and indicating pressures of fluid in the very high and medium pressure range, that is, pressures approximating 3,000 psi and greater.

When pressured fluid acts as above explained to advance the piston rod 30, the rod carries with it the cylindrical window element 58 according to FIG. 2. The degree of advancement, of course, depends upon the value of pressure admitted into the gauge.

The window element 58 carries an indicator mark 70, which may be simply a line, groove, or other marker extending circumferentially about the cylindrical element, or possibly within the confines thereof. As the cylindrical window element shifts lengthwise along the body portion 14, the mark 70 scans a calibrated area or scale 72 carried by said portion 14, of the body. The scale may consist of a calibrated sheet surrounding the body portion 14 and cemented thereon, or it may comprise calibrations applied directly upon body portion 14, FIG. 4.

From the foregoing, it will be understood that the indicator mark 70 registers with the scale calibrations to show pressure increases as the internal gauge pressure increases to extend the piston rod 30, which in turn elevates the window element along the gauge body. Corrections in pressure readings may be quite simply accomplished by loosening the adjusting set screw 64 and repositioning the window element lengthwise along the flat 46 of piston rod 30.

It is noted that piston body 54 is made rather extensive in length, in order to perform as an internal stop acting against spring keeper 44, to limit extensile movement of rod 30 and the compression of spring 56. The stop prevents full compression and over-compression of the spring, thereby to extend its useful life by reducing fatigue and overstress. The construction renders unnecessary the employment of pressure snubbing devices which undesirably increase the cost and the service requirements of the gauge.

For the purpose of preventing momentary lag and any accompanying sudden over-projection of piston movement incident to an initial or a succession of pressure charges imposed, the gauge is provided with a piston booster 74. The booster may be in the form of a comparatively light spring as shown, acting against piston 50 while the piston is in normally retracted position (FIG. 1), to urge the piston in the direction of advancement against the force of main spring 56. When the booster spring is heavily compressed by the force of main spring 56, as in FIG. 1, the energy stored within the booster spring is constantly available for imparting an auxiliary thrust for advancing the piston concurrently with the thrust imposed by an initial entry of pressure fluid into the gauge.

The booster spring preferably is limited as to its force and/or its length, so as to boost the piston advancement forcefully during only the initial stage of piston adcanvement. Thereafter, the effect of the booster spring upon the piston movement may be neglegible, by preference. While the booster spring illustrated is one of the helical type, it may be of any other suitable variety as desired. The spring, of course, offers no interference with entry of fluid into the gauge.

As depicted by FIG. 2, advancement of window element 58 exposes the calibrated portion 72 of the gauge to dust, moisture, corrosion and the like. Protection for such parts may be provided by the cover member 76, FIG. 1, which may be a transparent cylinder having a closed end 78 to overlie the head portion 60 of the window element. The open 80 of the cover member normally surrounds and snugly embraces a sealing member or O-ring 82 seated in an annular groove 84 of body 8, thereby to provide a tight closure.

The cover member 76 completely envelops the window element and the scale-bearing area of the gauge body. It may be constructed similarly to the window element, with one or more constituent parts formed wholly or partly of a transparent or translucent material such as a plastic or glass. The length and diameter of the cover member are such as to offer no interference with movements of the window element 58. The cover member may be displaceable from the gauge if desired.

The modified structure of FIG. 5 is suitable for low pressure usage. The body 8, window element 58, and adjusting means 64 are the same as in FIG. 2, but differences are found in the piston and the cylinder head member at the top of the body. In FIG. 5, the piston head 86 comprises a resilient sealing ring or O-ring 88 nicely fitting the body bore, and flanked by a pair of annular retainers 90, 90. The retainers may be in the form of centrally apertured discs of lubricant-impregnated material, similar to the powdered bronze lubricating elements 42, 42 of FIG. 2. If preferred, the retainers 90 may be non-lubricating in character.

The sealing element 88, retainers 90, 90 and the spacer 92 may be secured upon the lower end of piston body 54 in any suitable manner, or, in accordance with FIG. 5, by peening or swaging the piston body material at 94.

In accordance with FIG. 5, the head member 96, for supporting the piston rod and closing the upper end of the body bore, may comprise a simple centrally apertured disc having no substantial sealing relationship to the body bore of rod 30, the sealing here being largely unnecessary due to the presence of the seal at the piston head. The device of FIG. 5 may be provided with a booster spring, if desired, arranged according to FIGS. 1 and 2.

The high-pressure type of gauge illustrated by FIG. 4 is very similar to that of FIGS. 1 and 2, but with the following exceptions. The piston has its head 98 and spring seat 100 formed integrally with the piston body 54, as by means of a turning or molding operation. The piston rod 30 in this instance may be formed either in two pieces as shown, or as a one-piece element. As shown, the lower end of the piston rod is annularly grooved at 102 to accommodate a resilient split ring 104 which, in effect, serves as a head on the rod preventing downward displacement or disassociation of piston body 54 therefrom after assembly. Instead of the split ring 104 and groove 102, the piston rod may be formed with an integral head at the lower end thereof, large enough to serve as a rigid stop or abutment for the piston body 54 to rest upon while depressed by main spring 56. By this means, the separate part 104 may be eliminated with resultant savings of materials, machining, and assembly time.

FIG. 7 discloses a cylinder head member which corresponds to the head member 24 of FIG. 2, but is designed to greatly increase resistance to blow-out or bursting of the connection between the head and the upper end portion 10 of body 8. The modified construction omits the flat gasket 32 of FIG. 2, thereby enabling the formation of a strong metal-to-metal swage at the flange 26 where no space need be allotted for gasket accommodation. Accordingly, additional metal is made available for incorporation into the swage or roll connection above the flange 26.

To seal the swage or roll connection against fluid leakage, the neck 106 of head member 24 may be circumferentially grooved at 108 to accommodate a well-fitted O-ring 110 of rubber or rubber-like material bearing firmly against the wall of bore 16. To ensure the greatest possible resistance to blow-out or bursting, the neck of head member 24 is machined to have a nice fit within bore 16.

Except for the differences above mentioned, the FIG. 7 construction may be similar to that of FIG. 2; that is, the neck chamber may incorporate the interior piston rod seal means 40, 42. By means of the FIG. 7 construction resistance to blow-out or burst in the region of head 24 is nearly doubled. The modified construction, if desired, can be incorporated in all of the gauge structures illustrated.

It is noteworthy that those devices disclosed which make use of a loose or floating type piston, such as 50 or 98, require no accurate machining or finishing of body bore 16, nor of the piston itself. This type of construction effects substantial savings of materials, machining, labor, and time in manufacture and assembly. Furthermore, such construction results in minimizing friction and wear, thereby to enhance the accuracy and the useful life of the gauge.

The various gaskets, seals, lubricants and other components of the gauge are selected with due regard to their ability to withstand the injurious effects of any adverse environment in service, and attack by destructive fluids to which the gauge might be exposed. The scale markings such as 72 preferably extend completely about the cylindrical portion 14 of the gauge body, so as to be visible from all viewing angles, through the cylindrical window 58.

What is claimed is:

1. A pressure gauge for measuring and indicating pressure of a fluid comprising, an elongate tubular body having open, opposite ends, connecting means on one end of said body for connecting said pressure gauge to a source of pressure to be measured, said body having a reduced diameter at its other end extending over a major portion of the length of said body and defining a shoulder on said body between said one end and said reduced diameter portion, pressure indicating indicia on said reduced diameter portion of said body, an elongate, longitudinally extending pressure chamber within said body and extending over a major portion of the length of said body, an inlet port opening through said one end of said body into one end of said pressure chamber and having a substantially smaller cross sectional area and length than said pressure chamber, the other end of said body having an annular shoulder on the inner surface thereof with an annular, peripheral, upstanding flange therearound, an annular, ring shaped head member having a central opening therethrough and an annular peripheral flange resting on said shoulder, said upstanding flange on the end of said body swedged over said flange and securing said head member in place in said other end of said body, an elongate, longitudinally extending piston rod slidably extending through said opening in said head member and into said pressure chamber and having a length such that when at rest, one end of the piston rod is positioned adjacent said one end of said pressure chamber and the other end of said piston rod extends through said opening in said head member and projects beyond said other end of said body, a piston head on said one end of said piston rod for reciprocation in said pressure chamber and responsive to pressure changes within said pressure chamber to cause reciprocation of said piston head and said piston rod, a cylindrical transparent indicating sleeve having a closed end and an open end and axially adjustably secured at its closed end to said other end of said piston rod externally of said body with said indicating sleeve disposed in close surrounding relationship over said reduced diameter portion of said body, an indicating mark around said transparent indicating sleeve adjacent the open end thereof for cooperation with said indicia on said body to indicate the presence of high or low pressure in said pressure chamber, stop means on said piston rod within said pressure chamber arranged to engage said head member in said other end of said body to limit outward movement of said piston rod and said transparent indicating sleeve relative to said body, and compression spring means about the piston rod and engaged between said piston head and said head member in said other end of said body for urging said piston head, said piston rod and said transparent indicating sleeve toward said one end of said body against the force of fluid pressure within said pressure chamber.

2. The pressure gauge as in claim 1, wherein the closed end of said indicating sleeve has a thickened cross section and a central opening extending axially therethrough, said other end of said piston rod extending through said central opening and selectively adjustably secured therein by means of a set screw extending transversely through said closed end of said indicating sleeve into engagement with said other end of said piston rod to permit ready axial adjustment of said indicating sleeve relative to said piston rod.

3. A pressure gauge as in claim 2, wherein said piston head on said one end of said piston rod is slidably sealably engaged with the wall of said pressure chamber, said piston head comprising an annular resilient seal means secured to said one end of said piston rod and engaged with said side wall of said pressure chamber.

4. A pressure gauge as in claim 2, wherein said piston head is loosely received in said pressure chamber and comprises an annular member secured to said one end of said piston rod with its outer periphery spaced from the wall of said pressure chamber.

5. A pressure gauge as in claim 4, wherein a booster spring is interposed between said one end of said piston rod and said one end of said pressure chamber for assisting pressure of fluid entering the pressure chamber in initially moving the piston head and the piston rod associated therewith.

6. A pressure gauge as in claim 1, wherein a cylindrical transparent protective cover is positioned on said body in coaxial surrounding relationship to said cylindrical indicating sleeve, the length of said protective cover being such as to enable reciprocation of said piston rod and said sleeve on said body and within said cover upon the occurrence of pressure changes within said pressure chamber.

* * * * *